United States Patent [19]

Oda

[11] 4,239,277
[45] Dec. 16, 1980

[54] LID MOUNTINGS FOR AUTOMOBILE INTERIOR STORAGE CABINETS

[75] Inventor: Takaaki Oda, Musashi-murayama, Japan

[73] Assignee: Nissan Motor Company, Limited, Yokohama, Japan

[21] Appl. No.: 971,443

[22] Filed: Dec. 20, 1978

[30] Foreign Application Priority Data

Jan. 13, 1978 [JP] Japan .................... 53/3136[U]

[51] Int. Cl.³ ............................................. B60R 5/00
[52] U.S. Cl. ................................. 296/37.12; 180/90; 312/248
[58] Field of Search ............. 180/90; 296/37.1, 37.8, 296/37.12; 312/242, 248, 294, 295

[56] References Cited

U.S. PATENT DOCUMENTS

| | | | |
|---|---|---|---|
| 1,244,474 | 10/1917 | Cowles | 312/242 |
| 2,174,244 | 9/1939 | Jacobs | 312/242 |

*Primary Examiner*—John J. Love
*Assistant Examiner*—John A. Carroll

[57] ABSTRACT

The storage cabinet comprises a lid hingedly mounted thereon, an arcuate arm extending from the lid inwardly of the cabinet and having a slot formed at the end remote from the lid, and a coil spring having one end born at a convenient stationary part and the other end slidably received in the slot, whereby the lid can be passively held in a half-open position while being manually movable to a full open position against the action of the spring.

7 Claims, 6 Drawing Figures

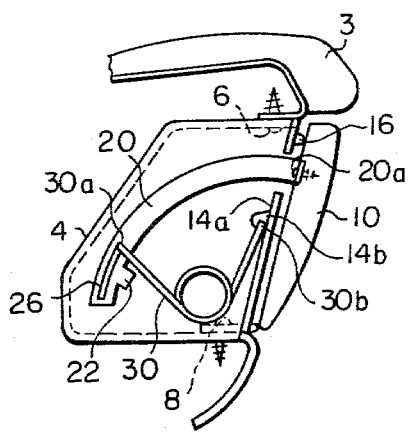
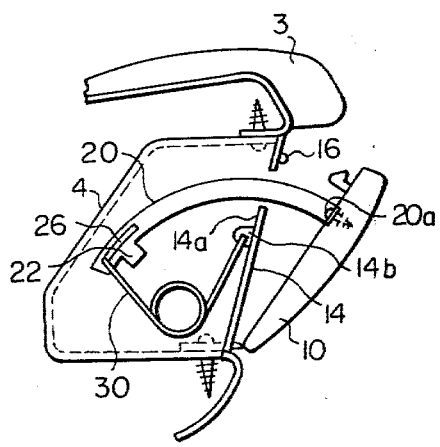
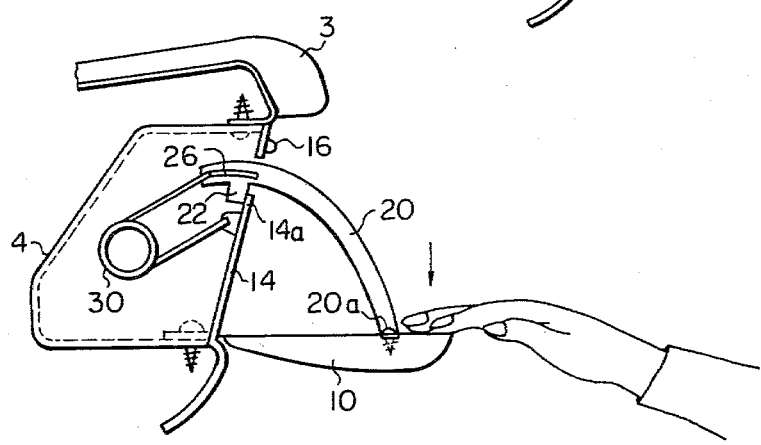

LID MOUNTINGS FOR AUTOMOBILE INTERIOR STORAGE CABINETS

This invention generally relates to an improved arrangement of automobile inside storage cabinets particularly on instrument panels and especially to mountings of lids on the storage cabinets.

A primary object of the invention is to provide an improved safety mountings of lids for storage cabinets on or adjacent the vehicle instrument panel in which provisions are made for keeping safety of drivers in front of the lids particularly in the moment of collision.

Another object of the invention is to provide improved mountings of lids for storage cabinets of the aforementioned type in which the lids can be passively kept in a half-open position where the driver's knees would not bump against the edge of the lid, while manual effort can hold the lids in full-open position.

Other objects, features and advantages of the invention will be apparent as the detailed explanation of a preferred embodiment proceeds in comparison with prior art lid mountings, reference being made to the accompanying drawings, in which similar reference numerals indicate like and corresponding parts throughout several figures.

FIG. 4 is a view similar to FIG. 2 illustrating a preferred embodiment of the invention in a closed position of the lid;

FIG. 5 is a view similar to FIG. 4 illustrating the half-open position of the lid; and FIG. 6 is a view similar to FIG. 4 illustrating the full-open position of the lid.

Figure 1:
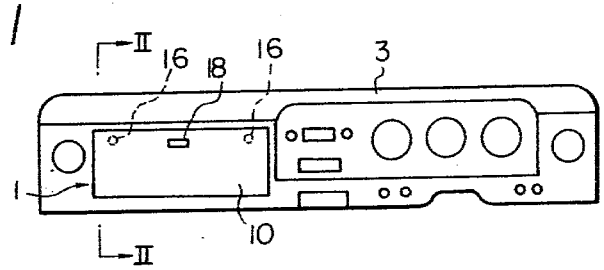
FIG. 1 is a schematic front elevation generally showing a vehicle instrument panel accommodating therein a storage cabinet or glove box.
Figure 2:
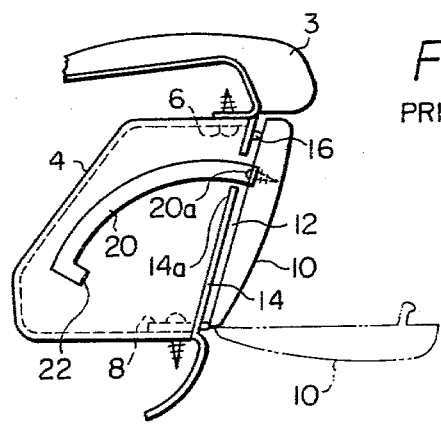
FIG. 2 is a sectional view taken along line II-II of FIG. 1 illustrating one example of prior art lid mounting.

Referring to FIGS. 1 and 2, the small storage cabinet, usually called a glove box 1, is fitted in a recess 4 formed in the padded instrument panel 3. The glove box 1 is at its top 6 and bottom 8 fastened as by screwing to walls of the instrument panel 3.

A lid 10 is hinged at its lower periphery to the bottom of the glove box 1 to open and close an opening 12 defined by edge wall 14 of the box 1 by its pivotal movement about the lower periphery. Cushioning rubbers 16 are formed on the walls 14 for cushioning abrupt bumping of the lid against the walls 14. Indicated by 20 is a stopper element consisting of an arcuate arm at one end 20a secured to the inner wall of the lid 10 and extending inwardly of the glove box through a small opening formed at the edge wall 14. The other end of the arcuate arm 20 is bent toward the lower periphery of the lid to form a small projection 22. As particularly seen in FIG. 1, an operating knob 18 is formed on the outer wall of the lid 10 which knob interlocks a key or lock mechanism (not shown) for holding the lid 10 in the closed position shown in FIG. 2.

By operating the knob 18, the lock mechanism is released to allow the lid to turn to the open position due to its own weight in the well-known manner. The lid 10 thus assumes substantially a full-open position represented by phantom line in which the projection 22 abuts against the edge 14a of the walls preventing further pivotal movement of the lid.

Figure 3:
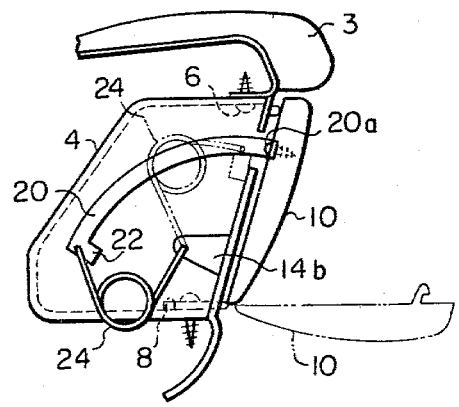
FIG. 3 is a view similar to FIG. 2 illustrating another example of prior art lid mountings.

Another known example of FIG. 3 is basically similar in construction to the example of FIG. 2 and additionally includes a coil spring 24 having one end carried by the projection 22 of the arcuate arm 20. The other end of the spring 24 is pivotally carried by any convenient stationary part such as an inward extension 14b of the edge wall of the glove box 1. It would be readily understood that in the closed position of the lid 10, the coil spring 24 tends to hold the lid in that closed position, while exerting a force to the lid to hold it in the open position once the lid has assumed the full-open position.

It will be apparent from the foregoing that in both prior art examples, the lid 10 assumes the full-open position as soon as the lock mechanism is released and is held in that position until the driver again closes the lid and sets the lock mechanism. The lid horizontally projected in front of the driver's seat may obstruct the occasional driver's motion for manipulating the instrument panel until he or she affords to reclose and relock the lid 10. More important probability is such that, if a collision accident should happen with the lid in full-open position, the knees of the driver will bump against the solid upper edge of the lid and may be seriously injured.

The invention incorporated in the illustrated embodiment prevents such danger and provides a lid mounting in which the lid is passively held in a half-open safety position by virtue of a kind of lost motion connection between the lid and the spring.

As is clearly seen in FIGS. 4 to 6, the arcuate arm 24 is at its inner end formed with a curved slot 26 in which the end 30a of a coil spring 30 is slidably received. The other end 30b of the spring is pivotally carried by the projection 14b or any convenient adjacent part of the instrument panel.

In the position shown in FIG. 4, the lid 10 is locked in the closed position where the end 30a of the spring 30 rests against the upper end of the curved slot 26 and is relieved of load. As soon as the lock mechanism is then released, the lid 10 is swung about the lower periphery due to its own weight until the end 30a of the spring abuts against the lower end of the curved slot 26. The spring 30 is slightly compressed due to the weight of the lid but is no longer compressed, since the load of the spring 30 is appropriately selected to overweigh the lid. It follows that the lid 10 rests in the desired half-open position as represented in FIG. 5. The lid in this position neither hinders the driver's motion nor hurts the driver's knees in the event of collision, while if desired, it can be easily moved to the full open-position without again releasing the lock mechanism, as will be hereinafter mentioned.

FIG. 6 represents the full-open position of the lid which is reached by manually turning the lid in the arrow indicated direction, compressing the spring 30. In this position, the compression force of the spring 30 constantly biases the arm 26 and therefore the lid 10 toward the closed position. Accordingly, the lid springs back to the position shown in FIG. 5 upon removing the driver's hand from the lid 10. Obviously, the lid can be moved back and locked in the closed position by manually forcing the lid toward the glove box.

Of course, the storage cabinet is not necessarily limited to a glove box adjacent the instrument panel of the type mentioned above but the invention is advantageously applicable to any small vacant space or recess formed in the interior of the vehicle body serving as a storage space.

What is claimed is:

1. Automobile interior storage cabinet comprising a body of the cabinet defining an opening,
a lid hingedly mounted on the cabinet body to cover the opening and adapted to be releasably held in a closed position,
stop means for stopping the turning movement of the lid in an open position,
means biasing the lid toward the closed position, and
a lost motion connection between the lid and the biasing means for rendering the biasing means active on the lid only after the lid turns toward the open position exceeding a predetermined angular position.

2. Automobile interior storage cabinet as defined in claim 1, in which said storage cabinet is a glove box mounted in a recess of an automobile instrument panel.

3. Automobile interior storage cabinet as defined in claim 1, in which said stop means includes an arcuate arm having one end secured to the lid and extending from the lid inwardly of the cabinet.

4. Automobile interior storage cabinet as defined in claim 3, in which said biasing means includes a coil spring having one end pivotally carried by any adjacent stationary part of the automobile and in which said lost motion connection includes means defining a slot in said other end of the arcuate arm for slidably carrying the other end of said coil spring.

5. Automobile interior storage cabinet as defined in claim 4, in which the load of the coil spring is so selected to substantially overweigh the lid.

6. An automobile interior storage cabinet comprising:
a body member opening on the interior of the automobile, a lid hinged to said body to cover said opening and adapted to be releasably held in a closed position, means for stopping movement of the lid in an open position including an arcuate arm having one end secured to the lid and an opposite end extending from the lid inwardly of the cabinet, means biasing the lid toward a closed position including a coil spring having one end pivotally carried by an adjacent stationary part of the automobile, a lost motion connection between the lid and the biasing means for rendering the biasing means active on the lid only after the lid turns beyond a predetermined angle toward an open position, said lost motion connection including a slot in said opposite end of the arcuate arm for slidably carrying the other end of said coil spring.

7. In an automotive interior storage cabinet having a body and a lid hinged to said body for pivotal movement between an open and a closed position, a spring connected at one end thereof to said body; and a lost motion device interconnecting the other end of said spring with said lid so that said lid can open to a predetermined angular position between said open position and said closed position before said lost motion device conncts said spring with said lid, so that the bias of said spring resists the further opening of said lid, thus preventing the lid from accidentally assuming a fully open position.

* * * * *